United States Patent
Haslim et al.

(10) Patent No.: US 10,126,426 B2
(45) Date of Patent: *Nov. 13, 2018

(54) MULTI-CLAD FIBER-BASED LIGHT DETECTION AND RANGING SENSOR

(71) Applicant: Uber Technologies, Inc., San Francisco, CA (US)

(72) Inventors: James A. Haslim, Dublin, CA (US); Michael D. Karasoff, San Francisco, CA (US); Nicholas M. Iturraran, Lodi, CA (US); Brent S. Schwarz, Redwood City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/809,666

(22) Filed: Nov. 10, 2017

(65) Prior Publication Data

US 2018/0088235 A1    Mar. 29, 2018

Related U.S. Application Data

(63) Continuation of application No. 14/050,036, filed on Oct. 9, 2013, now Pat. No. 9,823,351.

(60) Provisional application No. 61/738,646, filed on Dec. 18, 2012.

(51) Int. Cl.
| | |
|---|---|
| *G01C 3/08* | (2006.01) |
| *G01S 17/06* | (2006.01) |
| *G01S 7/481* | (2006.01) |
| *G02B 6/26* | (2006.01) |
| *G01S 17/42* | (2006.01) |

(52) U.S. Cl.
CPC .......... *G01S 17/06* (2013.01); *G01S 7/4812* (2013.01); *G01S 7/4817* (2013.01); *G01S 7/4818* (2013.01); *G01S 17/42* (2013.01); *G02B 6/262* (2013.01)

(58) Field of Classification Search
CPC ...... G01S 17/06; G01S 7/4812; G01S 7/4817; G01S 7/4818; G01S 17/42; G02B 6/262
See application file for complete search history.

(56) References Cited

U.S. PATENT DOCUMENTS

| | | |
|---|---|---|
| 5,317,148 A | 5/1994 | Gray et al. |
| 5,463,709 A | 10/1995 | Terao et al. |
| 5,489,149 A | 2/1996 | Akasu |
| 5,500,520 A | 3/1996 | Komine |
| 5,510,890 A | 4/1996 | Langdon et al. |
| 5,553,087 A | 9/1996 | Telle |
| 5,833,202 A | 11/1998 | Wolfgang |
| 5,838,478 A | 11/1998 | Hippenmeyer et al. |
| 5,844,708 A | 12/1998 | Anselment et al. |
| 5,949,530 A | 9/1999 | Wetteborn |
| 5,991,011 A | 11/1999 | Damm |
| 6,088,085 A | 7/2000 | Wetteborn |
| 6,512,518 B2 | 1/2003 | Dimsdale |

(Continued)

*Primary Examiner* — Samantha K Abraham
(74) *Attorney, Agent, or Firm* — Mahamedi IP Law LLP

(57) ABSTRACT

A light detection and ranging (LiDAR) sensor includes a single-mode fiber positioned to receive the outputted light from a laser. The LiDAR also includes an optical circulator, a multi-clad fiber, a first optical detector positioned to receive reflected light from an inner cladding of the multi-clad fiber, and a second optical detector positioned to receive the reflected light from a core of the multi-clad fiber.

20 Claims, 11 Drawing Sheets

(56) References Cited

U.S. PATENT DOCUMENTS

| | | |
|---|---|---|
| 6,563,105 B2 | 5/2003 | Seibel et al. |
| 6,710,324 B2 | 3/2004 | Hipp |
| 6,734,849 B2 | 5/2004 | Dimsdale et al. |
| 6,747,747 B2 | 6/2004 | Hipp |
| 6,757,467 B1 | 6/2004 | Rogers |
| 6,759,649 B2 | 7/2004 | Hipp |
| 6,847,462 B1 | 1/2005 | Kacyra et al. |
| 6,852,975 B2 | 2/2005 | Riegle et al. |
| 6,898,218 B2 | 5/2005 | McCarthy |
| 6,989,890 B2 | 1/2006 | Riegl et al. |
| 7,030,968 B2 | 4/2006 | D'Aligny et al. |
| 7,041,962 B2 | 5/2006 | Dallmann et al. |
| 7,190,465 B2 | 3/2007 | Froehlich |
| 7,193,690 B2 | 3/2007 | Ossig et al. |
| 7,323,670 B2 | 1/2008 | Walsh et al. |
| 7,345,271 B2 | 3/2008 | Boehlau et al. |
| 7,453,553 B2 | 11/2008 | Dimsdale |
| 7,485,862 B2 | 2/2009 | Danziger |
| 7,589,826 B2 | 9/2009 | Mack et al. |
| 7,649,617 B2 | 1/2010 | Walsh |
| 7,697,120 B2 | 4/2010 | Reichert et al. |
| 7,697,748 B2 | 4/2010 | Dimsdale et al. |
| 7,701,558 B2 | 4/2010 | Walsh et al. |
| 7,924,895 B2 | 4/2011 | McCarthy et al. |
| 8,040,525 B2 | 10/2011 | Bridges et al. |
| 8,120,780 B2 | 2/2012 | Bridges et al. |
| 8,174,682 B2 | 5/2012 | Suzuki et al. |
| 8,406,950 B2 | 3/2013 | Erb et al. |
| 8,953,911 B1 | 2/2015 | Xu |
| 9,270,080 B1 * | 2/2016 | Clowes .............. H01S 3/094003 |
| 2002/0139920 A1 * | 10/2002 | Seibel .................. A61B 1/0008 250/208.1 |
| 2006/0133731 A1 | 6/2006 | Sintov |
| 2007/0188735 A1 | 8/2007 | Braunnecker et al. |
| 2009/0323074 A1 * | 12/2009 | Klebanov ............. G01S 7/4818 356/477 |
| 2011/0137178 A1 | 6/2011 | Tearney |
| 2012/0154783 A1 | 6/2012 | Goldberg et al. |

\* cited by examiner

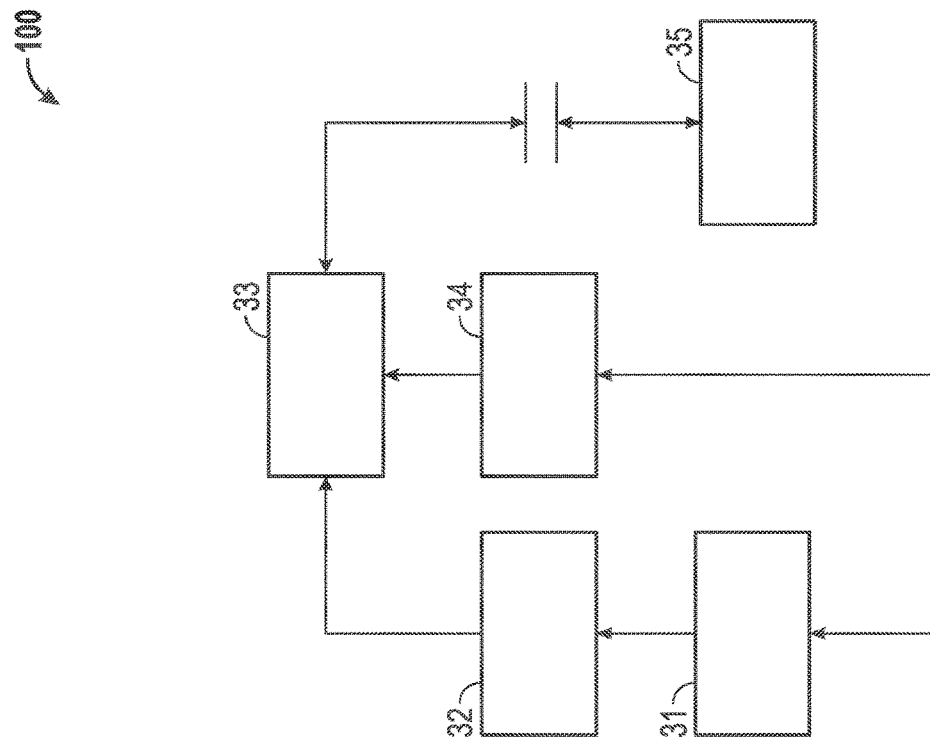
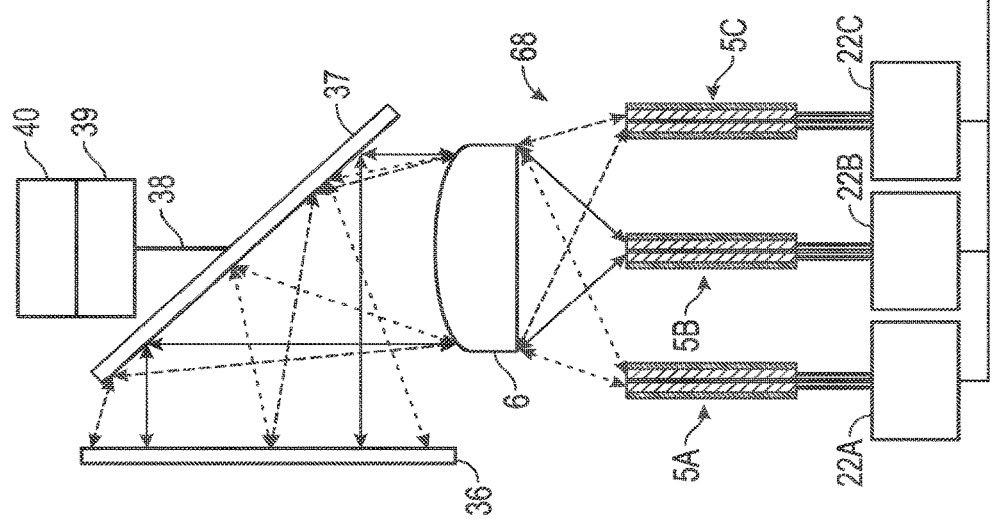
FIG. 10

MULTI-CLAD FIBER-BASED LIGHT DETECTION AND RANGING SENSOR

CROSS-REFERENCE TO RELATED APPLICATIONS

This application is a continuation of U.S. patent application Ser. No. 14/050,036, entitled "MULTI-CLAD FIBER BASED OPTICAL APPARATUS AND METHODS FOR LIGHT DETECTION AND RANGING SENSORS," filed Oct. 9, 2013; which claims the benefit of priority under 35 U.S.C 119(e) to U.S. Provisional Patent Application No. 61/738,646, filed on Dec. 18, 2012; the aforementioned applications being herein incorporated by reference in their respective entireties.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to optical apparatus and, more particularly but not exclusively, to optical apparatus for light detection and ranging sensors. Embodiments also relate to optical methods, and more particularly but not exclusively, to optical methods for light detection and ranging sensors. Embodiments also relate to LiDAR sensors.

BACKGROUND

Light detecting and ranging (LiDAR) sensors are utilized in a variety of applications to measure the distance to a target, to measure the angle to a target, to determine the location of a target, the speed of a target, the shape of a target, the reflectance of a target, or other target associated parameter. LiDAR sensors are used to collect data about objects without making physical contact with the object. Systems with integrated LiDAR sensors are used extensively to acquire three-dimensional geospatial information about a broad range of environments. For example, State Departments of Transportation (DOT) use LiDAR data to measure vertical clearances above roads at overpasses, bridges, and tunnels, as well as to inventory assets such as street signs, traffic lights, lane markings and fire hydrants to cite a few. Commercial mapping companies also use LiDAR to inventory assets such as gas pipelines, electrical transmission lines, to measure material removed from mines, and to map points of interest such as restaurants, parks, or schools located along roadways. LiDAR sensors are especially valuable for detecting objects located within dangerous or hard to access areas, and practitioners have integrated LiDAR sensors into positioning systems mounted in aircraft, on boats, and motor vehicles. Land surveyors have used positioning systems with integrated LiDAR sensors to create topographical maps for their customers.

There are many types of LiDAR sensors. One example of a LIDAR sensor is a Time of Flight based LiDAR sensor. Time of Flight based LiDAR sensors operate by measuring the elapsed time from when a pulse of light is emitted to when the reflected light pulse returns to the sensor. That measurement is known as the Time of Flight (TOF). The light pulse is typically generated by a laser. The reflected pulse is detected by a photoelectric transducer (detector), typically an avalanche photodiode. The measurement of elapsed time is performed by an electronic circuit. By using the formula Distance=(Speed of Light×Time of Flight)/2, a TOF LiDAR sensor can calculate a distance to an object to within one centimeter at ranges greater than 200 meters. Known architectures of LiDAR sensors use one optical path including a dedicated lens to direct outgoing laser pulses towards target surfaces and a second optical path including a separate lens to receive the reflected pulses and direct them towards a detector. Another example of a LiDAR sensor is a phased based LiDAR sensor.

There is a need to provide an improved optical apparatus and method for light detecting and range sensing.

SUMMARY

According to one aspect, there is provided an optical apparatus for light detection and ranging sensors. The apparatus may comprise an optical directing device and at least one multi-clad optical fiber. The multi-clad fiber comprises a core, at least one inner cladding, and an outer cladding. Herein the term "inner cladding" refers to the at least one inner cladding layer of the multi-clad fiber between the core and the outer cladding. The multi-clad fiber is arranged to receive optical rays transmitted from at least one light source and route transmitted optical rays on an optical path leading to the optical directing device. The optical directing device is configured both to direct the routed transmitted rays on an optical path leading to a target to be sensed and direct reflected optical rays from the target on an optical path leading to the optical fiber. The fiber is further configured to receive reflected optical rays and route the reflected optical rays for receiving by at least one detector.

In one embodiment of the optical apparatus, the core of at least one multi-clad fiber is arranged to receive optical rays transmitted from the at least one light source and route the transmitted optical rays on an optical path leading to the optical directing device. The optical directing device is configured both to direct the routed transmitted rays on an optical path leading to the target to be sensed and direct reflected optical rays from the target on an optical path leading to the core and inner cladding of the or each optical fiber. The inner cladding is configured to receive the reflected optical rays and route the reflected optical rays for receiving the by at least one detector.

In one approach, the optical rays reflected by the target and directed by the optical directing device into the core of the or each multi-clad fiber typically comprises an insignificant portion of the reflected light and one or more embodiments are not configured to detect this light. In some target conditions however, for instance when the target is a retroreflector, the light received by the core will comprise a significant portion of the reflected light and one or more embodiments comprise an optical circulator to enable the detection of substantially all of this reflected light in the core without reducing the efficiency of the coupling from the light source to the core. Non-reciprocal optical components other than optical circulators are envisaged. In one or more such embodiments, the one or more light sources are fiber coupled to the circulator by a single-mode fiber and the reflected light is coupled from the circulator to one or more detectors by a multi-mode fiber.

In one or more embodiments, the optical directing device is a refractive lens, a diffractive lens, or a focusing mirror. This focusing component operates as a single optical device. In one example, it comprises a single component. In another example, it comprises multiple components. The optical directing device serves to optically couple the target end of the at least one multi-clad fiber to the targets external to the apparatus.

By configuring the multi-clad optical fiber and optical directing device to direct the transmitted optical rays on an optical pathway leading to the target and direct the reflected optical rays on an optical pathway leading to the detector in the aforementioned manner, parallax error problems that occur in LiDAR sensors using separate optical lenses for directing transmitted and reflected optical rays respectively, are eliminated.

According to another aspect, a method for light detecting and ranging (LiDAR) sensing system is provided. The method can comprise receiving, in the core of at least one multi-clad optical fiber, optical rays transmitted from a light source of the sensing system; routing the transmitted optical rays through the core, directing the transmitted optical rays routed through the core on an optical path leading to a target to be sensed; receiving optical rays reflected from the target and directing the reflected optical rays to both the core and inner cladding of the or each multi-clad optical fiber; and routing the reflected optical rays through the inner cladding for receiving by a detector of the sensing system.

In one embodiment, apparatus further comprises a plurality of the multi-clad optical fibers, the plurality of multi-clad fibers comprising a first multi-clad fiber and a second multi-clad fiber. The first multi-clad fiber is arranged to receive first optical rays transmitted from at least one first light source and route the transmitted first optical rays on an optical path leading to the optical directing device. The optical directing device is configured both to direct the routed transmitted first optical rays on an optical path leading to a target to be sensed and direct reflected first optical rays from the target on an optical path leading to the first optical fiber. The first fiber is configured to receive the reflected optical first rays and route the reflected first optical rays for receiving by at least one first detector. The second multi-clad fiber is arranged to receive second optical rays transmitted from at least one second light source and route the transmitted second optical rays on an optical path leading to the optical directing device. The optical directing device is configured both to direct the routed transmitted second rays on an optical path leading to a target to be sensed and direct reflected second optical rays from the target on an optical path leading to the second optical fiber. The second fiber is configured to receive the reflected optical second rays and route the reflected second optical rays for receiving by at least one second detector.

In one or more of the embodiments, at least one optical circulator is incorporated into the optical apparatus. The optical circulator is arranged to direct the optical rays transmitted from the light source on the optical path leading to the multi-clad optical fiber and block the transmitted optical rays from reaching the detector. The optical circulator is further arranged to allow the reflected optical rays received and routed by the multi-clad optical fiber on an optical path leading to the non-reciprocal component to reach the optical path for a detector coupling the circulator.

In one or more of the embodiments, the optical apparatus includes an optical coupling device or system comprising one optical fiber extending between the at least one light source and the core of each multi-clad fiber; and at least one optical fiber extending between the inner cladding of each multi-clad fiber and the at least one detector for each multi-clad fiber. The fibers extending to the multi-clad fiber are coupled to the multi-clad fiber by fusion butt splice or other suitable techniques. By way of example, this coupling may also be achieved by proximal location of the fiber ends, optionally with an index matching substance between the multi-clad fiber and the other fibers to improve coupling efficiency. Parallel fiber coupling may be used to couple the inner core of each multi-clad fiber to fibers extending to the at least one detector for each multi-clad fiber.

In one or more of the embodiments, the apparatus has an optical coupling system for each multi-clad fiber configured to optically air couple each multi-clad fiber core to the at least one light source and/or the inner cladding of each multi-clad fiber to the at least one detector for each fiber.

In one or more of the embodiments that utilize optical air coupling between each multi-clad fiber and the at least one light source and/or the at least one detector, the embodiments further comprise an optical circulator for each multi-clad fiber, configured to direct optical rays transmitted from the at least one light source on an optical path leading to the core of each multi-clad fiber and block the transmitted light from the source from reaching the at least one detector. The circulator is further configured to direct optical rays received in the core of each multi-clad fiber on a path leading to the at least one detector. In one or more such embodiments, the received light in the core is directed by the circulator to a separate detector from the detector receiving light from the inner cladding. Alternatively, one or more embodiments may be configured so that received light in the core may be directed by the same detector that receives light from the inner cladding.

In one or more of the embodiments, the apparatus has an optical coupling system configured to air couple the light from an array of apparent light sources to the cores of the multi-clad fiber arranged in a similar array, and configured to air couple the source/detector ends of the multi-clad fibers (both cores and inner claddings) to a similar array of detectors. This air coupling is achieved by an optical imaging arrangement. While it requires precision relative placement between the items in each array so that the arrays precisely match each other, this approach may provide a more compact system with lower part count and simplified alignment during assembly. In one or more such embodiments, the array of apparent light sources may comprise optical fibers coupled to one or more light sources.

In one or more embodiments, the apparatus has an optical coupling system for each multi-clad fiber that comprises an optical circulator. The optical circulator is arranged to direct optical rays transmitted by the at least one light source to the core of each multi-clad fiber and block source rays from reaching the detector for each multi-clad fiber. The optical circulator is further arranged to direct reflected optical rays received in both the core and inner cladding of each multi-clad fiber on an optical path to the detector for each multi-clad fiber. In one or more such embodiments the one or more light sources would be fiber coupled to each circulator by a single-mode fiber, and the received light would be coupled from each circulator to each detector by a multi-mode fiber.

According to another aspect, there is provided a method for light detection and ranging sensors, the method comprises receiving, in at least one multi-clad optical fiber, optical rays transmitted from at least one light source; routing the transmitted optical rays through the fiber, directing the transmitted optical rays routed through the fiber on an optical path leading to a target to be sensed; receiving reflected optical rays from the target and directing the reflected optical rays into the optical fiber; and routing the reflected optical rays through the fiber for receiving by a detector.

In one embodiment, the step of receiving, in at least one multi-clad optical fiber, optical rays transmitted from at least one light source comprises receiving, in the core of at least one multi-clad optical fiber, optical rays transmitted from at least one first light source. The step of routing the transmitted optical rays comprises routing the transmitted optical rays through the core. The step of directing the transmitted first optical rays routed through the or each fiber on an optical path leading to a target to be sensed comprises directing, utilizing an optical directing device, the transmitted optical rays from the core of the or each fiber on the optical path to the target. The step of directing the reflected optical rays into the optical fiber comprises directing, utilizing an optical directing device, the reflected optical rays into the inner cladding of each optical fiber. The step of routing the reflected optical rays through the or each fiber comprises routing the reflected optical rays through the inner cladding of each fiber for receiving by at least one detector.

In one or more examples of the method, the optical directing device is a refractive lens, a diffractive lens, or a focusing mirror.

The method can further comprise directing, utilizing an optical circulator for the or each multi-clad fiber, the optical rays transmitted from the at least one light source on an optical path leading to the core of the or each multi-clad fiber and blocking the transmitted optical rays from reaching the at least one detector; routing the transmitted optical rays through the core of the or each fiber, directing, utilizing the optical directing device, optical rays reflected from the target to the core of the or each fiber, routing reflected first optical rays through the core on an optical path leading to the optical circulator for the or each fiber; and directing, utilizing the optical circulator for the or each fiber, the reflected optical rays routed through the core of the or each fiber on an optical path to the at least one detector. In other embodiments in which the method comprises receiving the transmitted optical rays in a plurality of multi-clad fibers, the method includes utilizing a respective optical circulator for one or more but not all of the multi-clad fibers of the plurality of multi-clad fibers.

In one embodiment, the method can further comprise directing, utilizing a second non-reciprocal component, the optical rays transmitted from the at least one second light source on an optical path leading to the second core and blocking the transmitted optical rays from reaching the at least one second detector; routing the transmitted optical rays through the second core, directing, utilizing the optical directing device, optical rays reflected from the target to the second core, routing reflected optical rays through the second core on an optical path leading to the second non-reciprocal component; directing, utilizing the second non-reciprocal component, the reflected optical rays routed through the second core on an optical path to the at least one second detector.

In one or more embodiments, a transverse motion component is included to move the ends of the one or more multi-clad fibers. The ends moved are those that project transmitted light to and receive reflected light from the optical directing device. The fiber ends are moved relative to the optical directing device in one or more directions transverse to the directing device's main optical axis, while substantially maintaining their focal relationship to the optical directing device. The motion is small enough that the light projected toward the optical directing device stays within its clear aperture. This transverse motion has the beneficial effect of changing the angle at which the optical directing device directs rays to and from targets. Since the fibers are lightweight and flexible, this sensing angle can be changed very rapidly. This transverse motion mechanism forms the basis for high speed scanning of the sensing direction. Because the transmitted light projects to the optical directing device from the same fiber end where the optical directing device directs received reflected light, this transverse motion does not cause a loss of alignment or reduce the ability of the apparatus to sense targets. It would be optically equivalent to move the optical directing device relative to the ends of the multi-clad fibers, while the fibers remain stationary. Embodiments of the apparatus could be constructed in which the optical directing device is transversely moved while the fiber ends remain stationary. In some examples, embodiments of either type would implement oscillatory transverse motions in the frequency range of 5 Hz to 5000 Hz. Embodiments of the apparatus which move a smaller mass would likely be preferred since the smaller mass induces smaller mechanical reaction forces in the apparatus given the same displacement amplitude and frequency.

In yet another aspect, a LiDAR sensor is provided comprising an optical apparatus of any of the aforementioned embodiments.

According to yet another aspect, a light detecting and ranging (LiDAR) sensor is provided. The LiDAR sensor comprises any one of the optical apparatus of the aforementioned embodiments.

According to yet another aspect, a method of operating the aforesaid light detecting and ranging (LiDAR) sensors is provided.

DESCRIPTION OF THE DRAWINGS

FIG. 10 is a schematic diagram depicting an exemplary LiDAR sensor incorporating the multiple multi-clad fiber based optical apparatus of FIG. 8 according to one embodiment.

DETAILED DESCRIPTION

Figure 1:
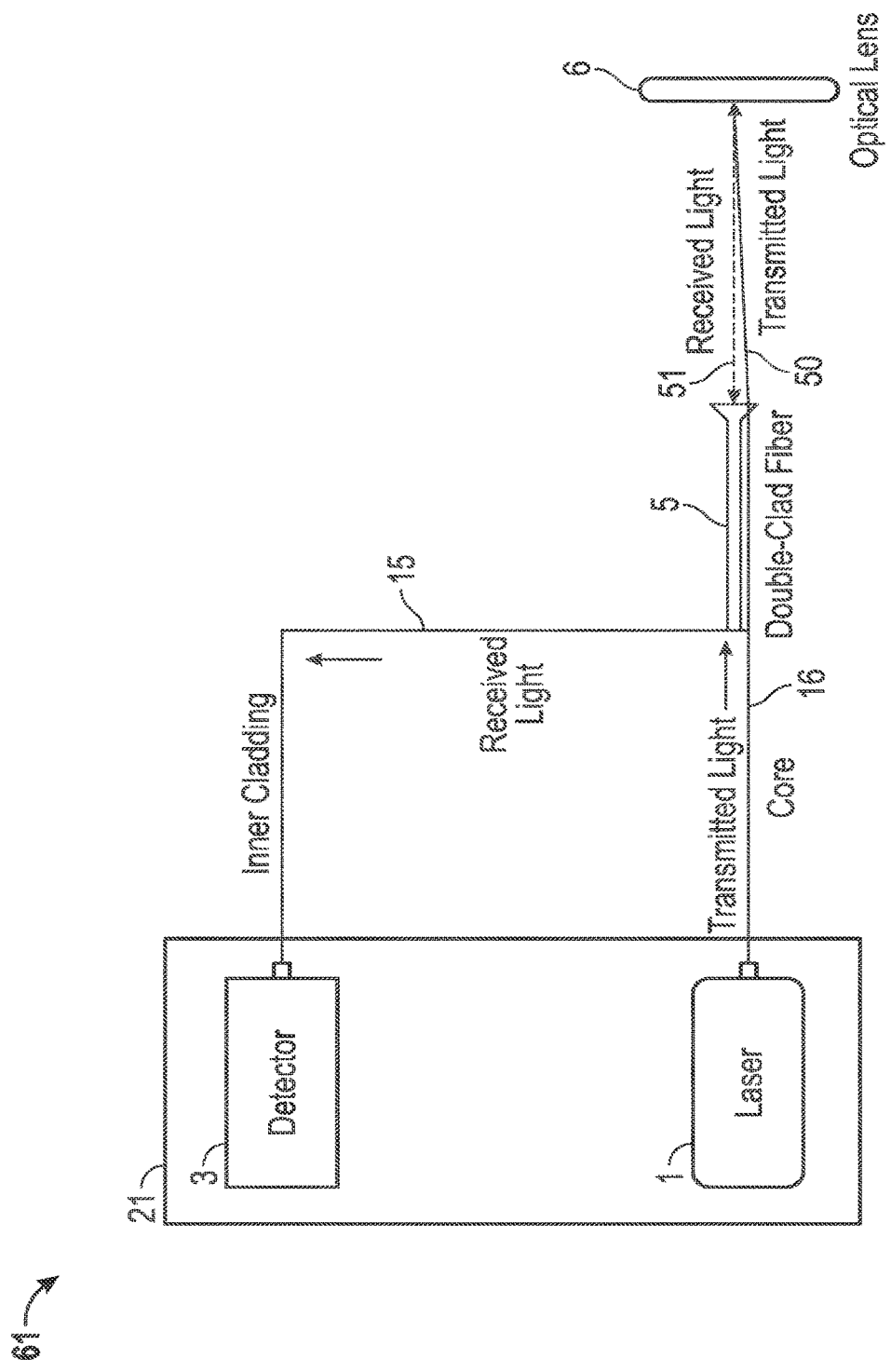
FIG. 1 is a schematic system diagram illustrating a multi-clad fiber based optical apparatus for a light detecting and ranging (LiDAR) remote sensing system according to an embodiment.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

The term "LiDAR sensor" refers herein to a device that measures the distance and reflectance values of objects within its immediate environment. There are many types of LiDAR sensors.

The term "laser pulse" refers herein to an outbound light fired by the light source.

The terms "target or target surface" refer herein to any object surface which is to be illuminated. The target need not be a solid object (e.g. liquids, fog, airborne dust). In a LiDAR sensor, the object surface is outside the LiDAR sensor and is illuminated by the sensor's laser pulse.

The term "reflected rays" refers herein to inbound light directed toward the detector.

"Time-of-Flight (TOF)" refers herein to a method for measuring the time it takes for light pulse to exit the sensor, be reflected by a target surface, and return to the sensor. It is not unique to LiDAR sensors; many instruments measure TOF for a wide variety of things (e.g. RADAR and SoNAR). A TOF LiDAR sensor uses the TOF method to calculate distances. Embodiments described herein can be used in other LIDAR sensors, such as phase based LiDAR sensors.

Technical features described in this application can be used to construct various embodiments of methods and apparatus for light detecting and range sensing. In one approach, a light detecting and ranging (LiDAR) sensor uses an optical directing device; a multi-clad optical fiber, a light source, and a detector. The light source is optically coupled to the multi-clad optical fiber which is configured to receive optical rays transmitted from the light source and route the rays on an optical path leading to the optical directing device. The optical directing device is configured both to direct the transmitted optical rays routed through the multi-clad fiber towards a target to be sensed and direct optical rays reflected from the target on an optical path leading to the multi-clad optical fiber. The multi-clad optical fiber is configured to receive the reflected optical rays and route the reflected optical rays on an optical path leading to the detector. The detector is configured to detect the reflected optical rays. In this same approach additional multi-clad fibers may be configured in the same way to receive optical rays transmitted from the same or additional light sources and may be configured in the same way to route reflected optical rays on optical paths leading to the same or additional detectors. Each multi-clad fiber differs in its angular relationship to the optical directing device so that the optical directing device directs transmitted optical rays from each multi-clad fiber in a different direction to external targets and likewise receives reflected optical rays from different target directions routing them back along substantially the same directions to each multi-clad fiber that transmitted in each direction.

In one approach, optical coupling operably couples the light source to a core of the multi-clad optical fiber. Optical coupling operably couples the inner cladding to the detector. The core of the multi-clad fiber is arranged to receive optical rays transmitted from the light source and route the transmitted optical rays on an optical path leading to the optical directing device. The optical directing device is configured both to direct the transmitted optical rays routed through the core towards a target to be sensed and direct optical rays reflected from the target on an optical path leading to both the core and the inner cladding of the multi-clad fiber. The inner cladding is configured to receive the reflected optical rays and route the reflected optical rays on an optical path leading to the detector. The detector is configured to detect the reflected optical rays.

Known architectures of LiDAR sensors from prior art use one optical path including a dedicated lens to direct outgoing laser pulses towards target surfaces and a second optical path including a separate lens to receive the reflected pulses and direct them towards a detector. Such an approach requires careful alignment be made and maintained between the components of the two optical paths. Such an approach suffers the additional size, weight, and cost of the lens for the outgoing optical path. If such an approach uses a parallel offset to separate the optical paths, the sensor may suffer degraded performance with targets in the near field as the reflected light focuses to a point away from the center of the detector.

Such an approach suffers from a parallax error that is created by the distance between the positions of the transmitting and receiving lenses. The parallax error manifests itself in a reduced amount of optical rays reaching the detector and a subsequent weaker signal. The weaker signal reduces the sensor's overall performance for measuring distances and calculating reflectance values for objects near the sensor. One or more embodiments described herein have several advantages over existing optical apparatus found in LiDAR sensors. The first is the elimination of a lens. This reduces the LiDAR's bill of material cost and eliminates the parallax error. Eliminating the lens also eliminates the time and labor of aligning the second lens and/or the components behind the second lens.

Reference will now be made to the drawings in which the various elements of embodiments will be given numerical designations and in which embodiments will be discussed so as to enable one skilled in the art to make and use the invention.

Specific reference to components, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

In the exemplary optical apparatus described herein with reference to the figures, the core of the multi-clad fiber is configured to act as a single mode waveguide for the light source's wavelength. This is chosen to afford the highest quality, possibly diffraction limited, beam profile for the optical rays transmitted by the optical directing device to the target. However, in other embodiments, the core of the multi-clad fiber is configured as a waveguide operating in a multi-mode.

FIG. 1 depicts a schematic system diagram illustrating the use of multi-clad fiber based optical apparatus for a light detecting and ranging (LiDAR) remote sensing according to an embodiment. The optical apparatus 61 comprises an optical sub assembly 21, multi-clad fiber 5 and optical directing device 6. Sub assembly 21 comprises a laser or other light source 1, a detector 3, and optical coupling for coupling the laser and detector to the multi-clad fiber 5. Multi-clad fiber 5 is configured to route a laser pulse from the laser 1 to an optical lens 6 and route received optical rays 51 back through the multi-clad fiber 5 to the detector 3.

In FIG. 1, the optical apparatus transmits and receives optical rays to enable measurement of the sensor's distance to a target and calculate a reflectance value for that target. The process starts when the laser fires optical rays into an optical fiber 16 leading to the core of a multi-clad optical fiber 5, and the optical rays 50 are transmitted through a lens 6 towards targets down range. The optical rays 50 strike a target and are reflected back towards the same lens. The lens focuses the reflected optical rays 51 into both the core and the inner cladding of the multi-clad fiber 5. An optical fiber 15 couples light from the inner cladding onto the detector 3. In other embodiments, the optical directing device can be a focusing mirror, for example a parabolic reflector, instead of lens 6. In other examples, the optical directing mechanisms used as the device to direct optical rays are diffractive lenses or refractive lenses. Combinations of such optical components may also be used to provide the optical directing mechanism. In yet other examples, any component(s) or mechanism that is capable of focusing the reflected optical rays down into the multi-clad optical fiber can serve as the optical directing device.

Figure 2:
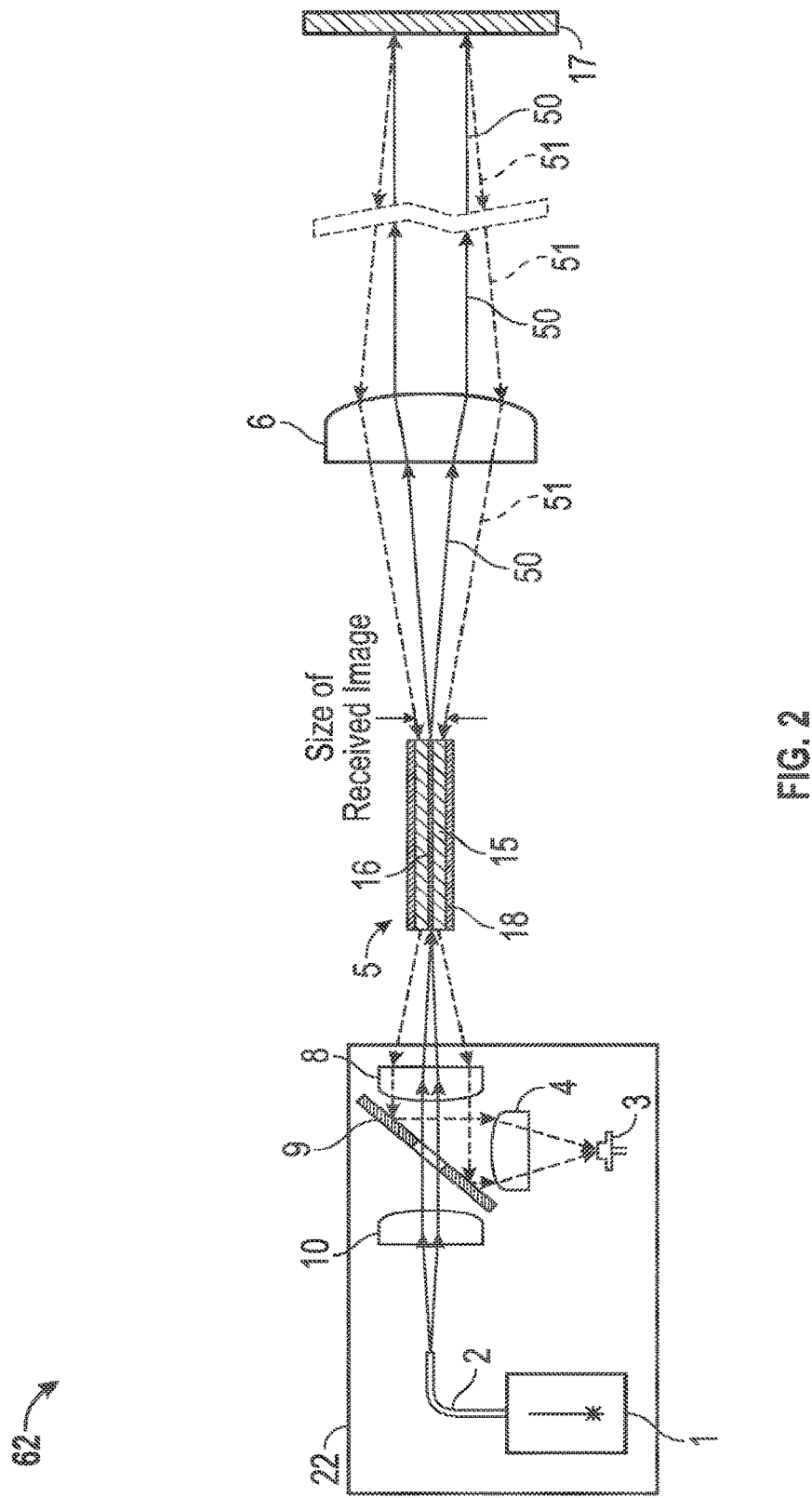
FIG. 2 is a schematic diagram depicting an optical apparatus for a light detecting and ranging (LiDAR) sensing system according to an embodiment.

FIG. 2 depicts a schematic diagram of the multi-clad fiber based optical apparatus according to an embodiment. The optical apparatus 62 comprises an optical sub assembly 22, multi-clad fiber 5 and optical directing device 6. The optical sub assembly 22 comprises a light source 1, which in this example is a laser 1, detector 3 and optical coupling elements 2, 4, 8, 9 and 10. In the example of FIG. 2, the optical apparatus for the LiDAR sensing system is an air-coupled apparatus. The detector 3 in this example is an avalanche photodiode (APD). In other examples, other types of diodes or light to electrical transducers can be used as the detector. The multi-clad optical fiber 5 has a core 16, inner cladding 15 and outer cladding 18. The optical directing device is in the form of lens 6. Lens 4, mirror with hole 9 and optical lenses 8 & 10 form optical coupling arranged to air couple the fiber core to laser 1 and air couple the fiber inner cladding to the detector 3.

In FIG. 2, the fiber core 16 is arranged to receive optical rays transmitted from the light source 1 and route the transmitted optical rays towards optical lens 6. Optical lens 6 is configured both to direct the transmitted optical rays routed through the core 16 towards a target surface 17 to be sensed and direct optical rays reflected from the target towards both the core 16 and the inner cladding 15 of the optical fiber 5. The inner cladding 15 is configured to receive the reflected optical rays and route the reflected optical rays towards the detector 3. The detector is configured to detect the reflected optical rays. In other embodiments, the optical directing device can be a focusing mirror, for example a parabolic reflector. In other examples, the optical mechanism used to direct optical rays is a diffractive lens or refractive lens. Combinations and/or a multiplicity of such optical components may also be used to provide such an optical mechanism. In yet other examples, any component(s) or mechanism that is capable of focusing the reflected optical rays down into the multi-clad optical fiber can serve as the optical directing device.

One example of the method of operation of the optical apparatus 62 is as follows. The multi-clad fiber based optical apparatus 62 uses a free space fiber coupling arrangement that allows a light pulse fired by the Laser 1 from the optical sub assembly 22 to travel through a hole in the mirror 9 and into multi-clad fiber 5. After the light pulse strikes the target surface 17 down range, the reflected light pulse travels back towards the optical subs assembly 22, through lens 6, enters and then subsequently exits multi-clad fiber 5, and the reflected light pulse then travels through a second lens 8 and is directed onto mirror 9. After being reflected off the mirror 9, the optical ray travels to yet another lens 4 that directs the optical ray onto the detector 3.

The commercial advantages of using the optical apparatus of the one or more embodiments are:

1. Allows simpler design of LiDAR sensors that are easier and less expensive to build. It has only one lens for directing transmitted rays onto the target and receiving reflected optical rays instead of two. It eliminates the need to precisely align the laser emitter and detector behind this lens.

2. Embodiments are more reliable in the field than optical apparatus used in known LiDAR sensors. Small displacements of the double clad fiber relative to the lens, caused by vibration or temperature change, will not result in a loss of alignment between the laser emitter and detector. For example, a LiDAR sensor that uses separate channels for routing light pulses from the emitter and optical rays to the detector that are exposed to constant vibration and sudden shock are vulnerable to moving out of alignment. Once out of alignment, the LiDAR sensor will provide erroneous data. An optical path that uses multi-clad fiber has a single channel for both the emitter and detector. This approach avoids the misalignment problem that might occur when the LiDAR sensor is exposed to vibrations and shock as the multi-clad fiber moves as one part.

Figure 3:
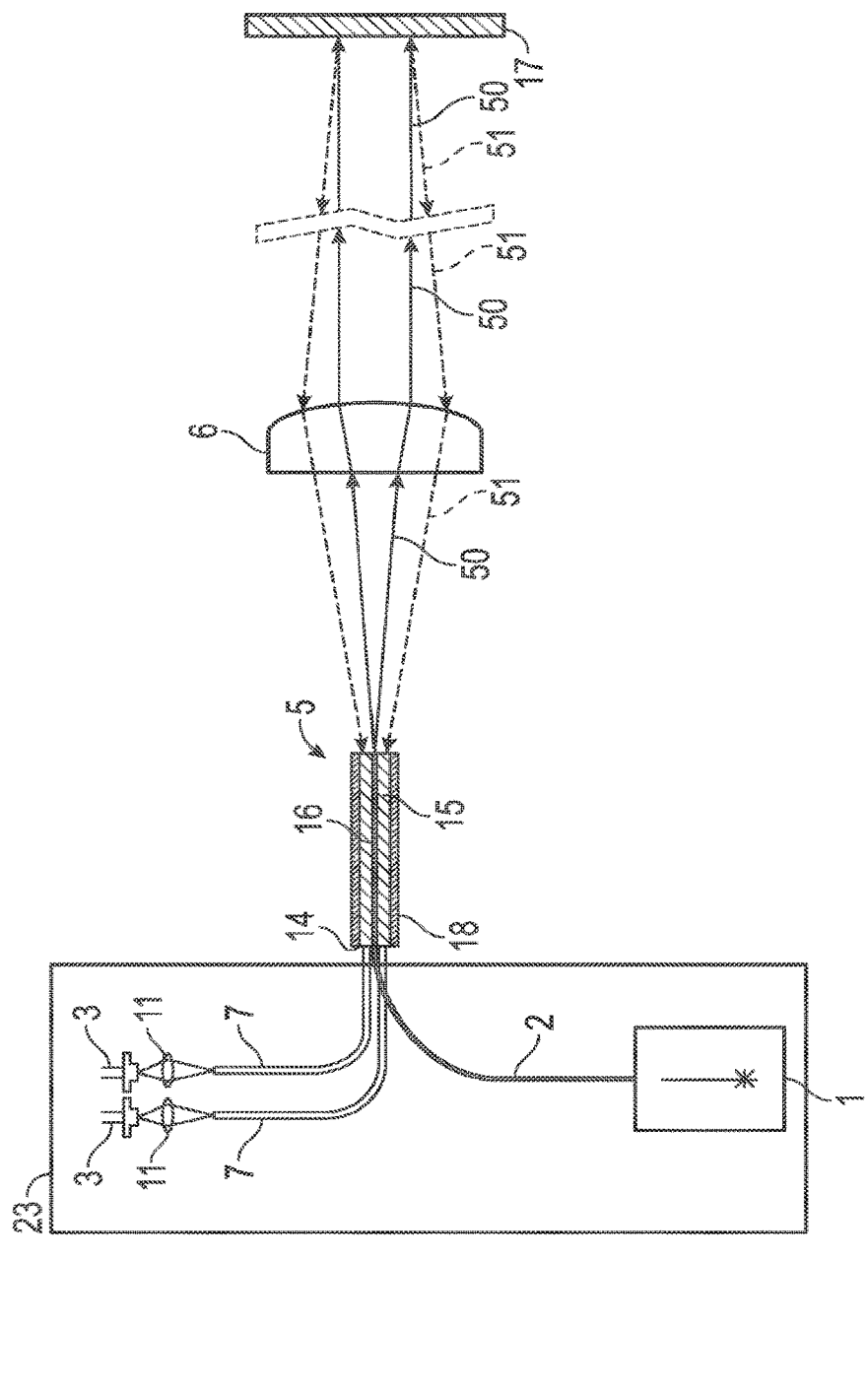
FIG. 3 is a schematic diagram depicting an optical apparatus for a light detecting and ranging (LiDAR) sensing system according to an embodiment.

Referring now to FIG. 3, which depicts a schematic diagram of an optical apparatus 63 for light detecting and range sensing according to another embodiment. The optical apparatus has an optical sub-assembly 23, multi-clad fiber 5, and optical directing device 6. The sub-assembly 23 comprises a laser 1, coupling fibers 2,7 detectors 3 and optical lenses 11 coupling fibers 7 to the detectors 3. Optical directing device 6 is in the form of an optical lens. The plurality of detectors 3 is in this example a plurality of avalanche photodiode-detectors. Multi-clad optical fiber 5 has a core 16, an inner cladding 15 and outer cladding 18. In this example, core 16 of the multi-clad fiber at optical fiber splice location 14 is optically coupled to the light source 1 by optical fiber 2. Inner cladding 15 of the multi-clad fiber 5 is optically coupled to the plurality of photo detectors by optical fibers 7.

In FIG. 3, core 16 is arranged to receive optical rays transmitted from light source 1 via coupling fiber 2 and route the transmitted optical rays towards the optical lens 6. The optical lens 6 is configured both to direct the transmitted rays routed through the core towards a target 17 to be sensed and direct reflected optical rays 51 from the target towards both the core and the inner cladding of the multi-clad fiber 5. The inner cladding is configured to receive the reflected optical rays and route the reflected optical rays towards the optical splicing location 14. At the optical splicing location, the fiber splits the reflected optical rays routed through the inner cladding 15 into a plurality of reflected optical ray beams. The plurality of LiDAR detectors 3 are optically coupled to the inner cladding 15 by fibers 7 to respectively detect the reflected plurality of beams. In other embodiments, the optical directing device can be a focusing mirror, for example a parabolic reflector. In yet other examples, any component(s) or mechanism that is capable of focusing the optical rays down into the multi-clad optical fiber can serve as the optical directing device. In other examples, other types of diodes or light to electrical transducers can be used as each detector 3. Also, in other examples, the detectors 3 may be different from one another.

Figure 6:
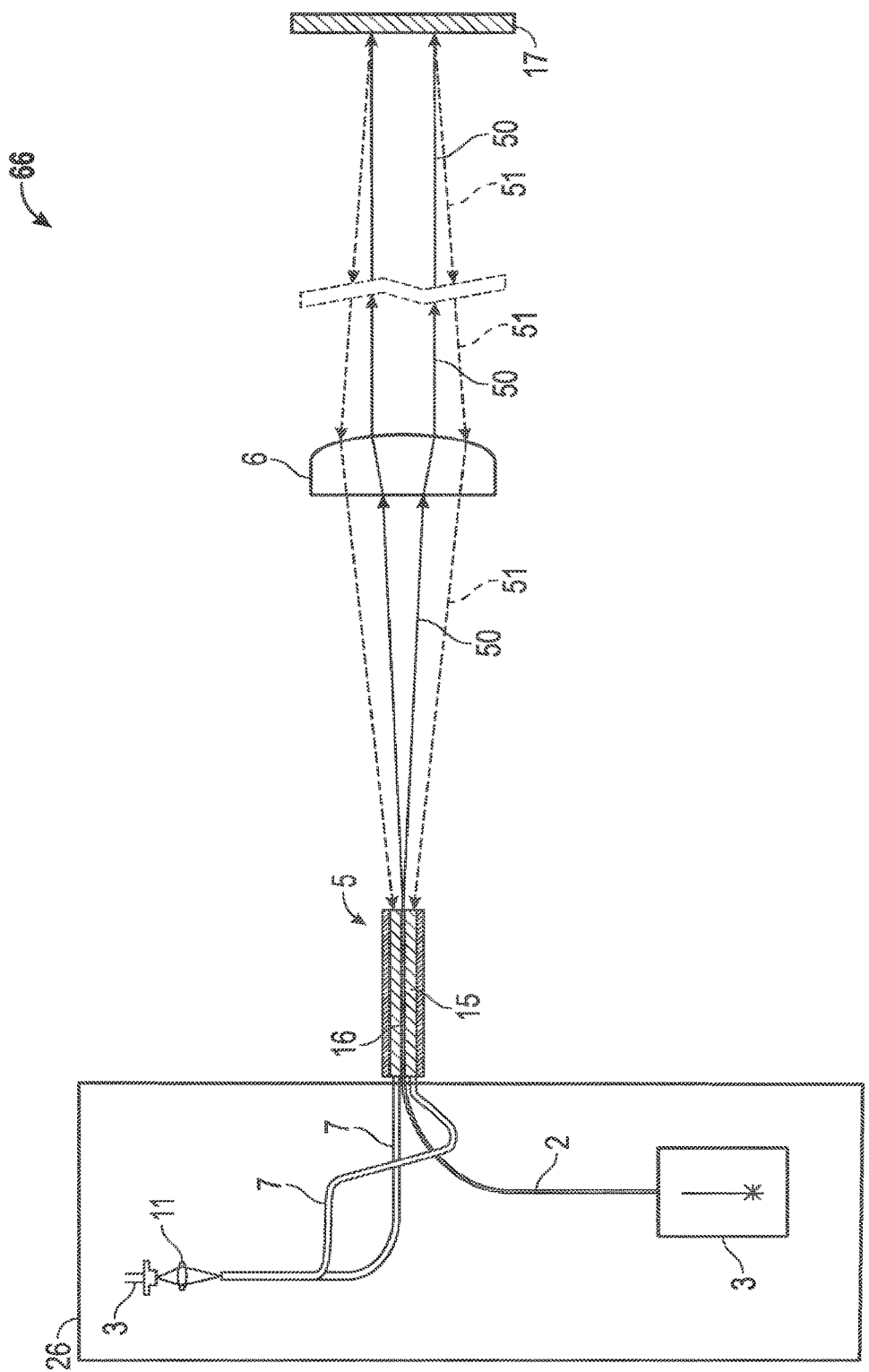
FIG. 6 is a schematic diagram depicting an alternative example of the optical apparatus of FIG. 2 in which a single detector is utilized.

Furthermore, in an alternative example of the optical sub assembly 23 of FIG. 3, optical fibers 7 can be operably coupled to the same single optical detector 3 to route reflected light from the inner cladding 15 to the same detector 3. One example of such an optical sub assembly 26 is shown in the schematic diagram of the optical apparatus 66 of FIG. 6.

In another aspect of the optical apparatus, a non-reciprocal optical component is integrated into the design to capture the optical rays received by the core of the multi-clad fiber. In non-reciprocal optics, changes in the properties of light passing through the device are not reversed when the light passes through in the opposite direction. In one embodiment, the non-reciprocal optical component integrated into the system is an optical circulator. In one approach the optical circulator is integrated into the design between the light source and the core of the multi-clad fiber. The optical circulator directs the optical rays from the light source out through the core of the multi-clad fiber to the optical directing device. Reflected optical rays that return through the optical directing device are focused into both the inner cladding and the core of the multi-clad fiber. Reflected optical rays received into the core return to the optical circulator which directs these rays toward a detector. The optical circulator directs the vast majority of optical rays from the light source toward the core of the multi-clad fiber and it directs the vast majority of the optical rays from the core of the multi-clad fiber toward the detector. There is very little leakage through the optical circulator from the light source directly toward the detector and very high transmission in the preferred directions.

The optical circulator is a component for routing the light within the optical path of the multi-clad Fiber. The important characteristic of the optical circulator is that light that enters one port exits from the next port. In a typical three port design, light enters port 1 will exit port #2. Light that enters the optical circulator from port #2 will exit from port #3. This enables bi-directional communication over a single fiber (Multi-clad fiber). Optical circulators are non-reciprocal optics.

Figure 4:
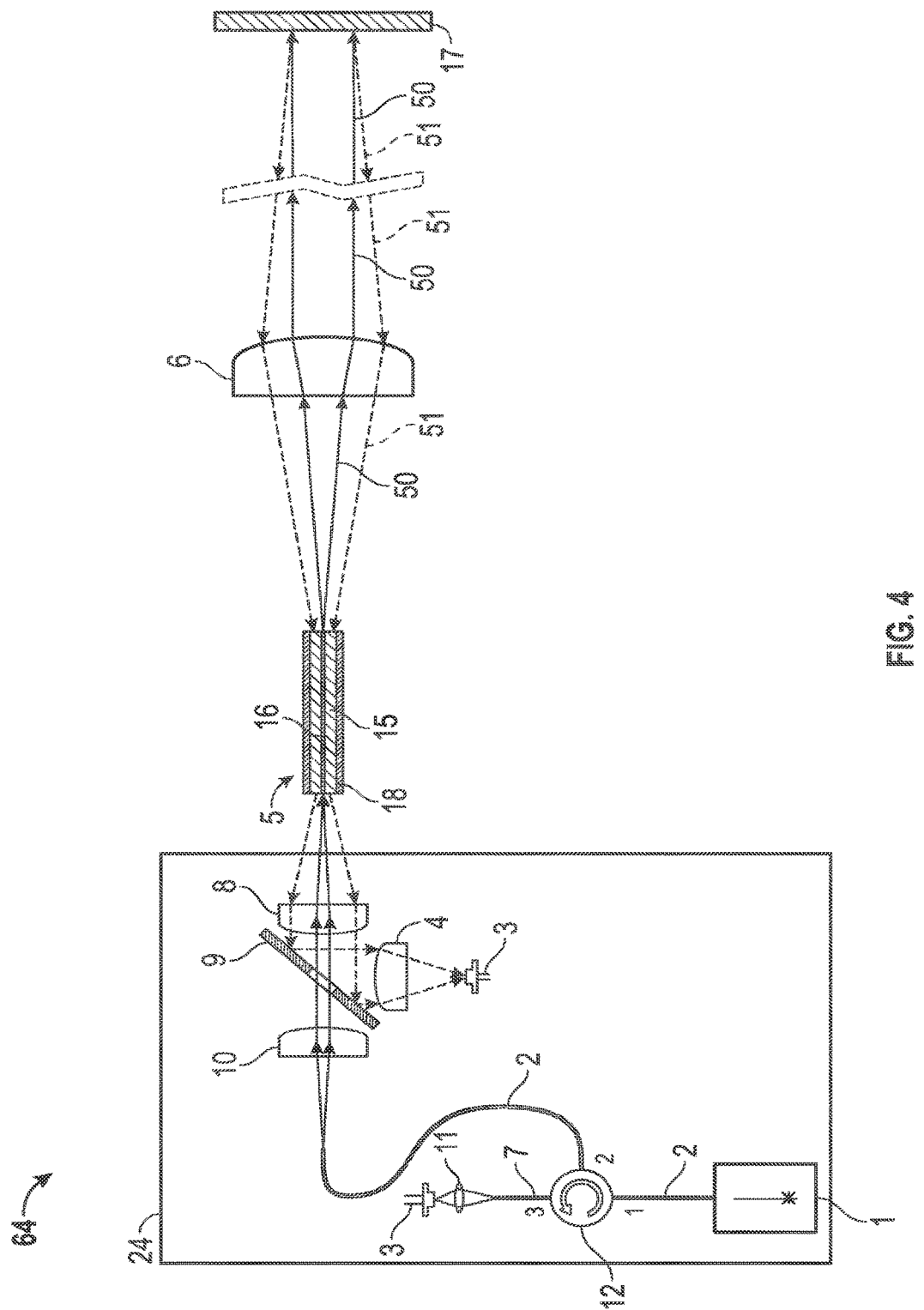
FIG. 4 is a schematic diagram depicting an optical apparatus for a light detecting and ranging (LiDAR) sensing system including an optical circulator according to an embodiment.

Reference will now be made to embodiments of the optical apparatus in which non-reciprocal optical components are utilized. By way of example, FIG. 4 is a schematic diagram depicting an optical apparatus 64 for a light detecting and range sensing (LiDAR) according to one embodiment. The optical apparatus comprises an optical sub assembly 24, multi-clad fiber 5 and optical directing device 6. In the example of FIG. 4, optical apparatus 64 comprises an air-coupled multi-clad based optical apparatus as shown in FIG. 2 but with an optical circulator integrated therein. Optical sub assembly 24 shown in FIG. 4 has a light source, which in this example is a laser 1, optical fibers 2, detectors 3, which in this example are avalanche photodiode-detectors, mirror with hole 9 and further optical lenses 4, 8, 10 and 11. The optical directing device is in the form of optical lens 6, multi-clad optical fiber 5 has a core 16, inner cladding 15 and outer cladding 18. Optical fiber 2 and lens 11 optically couples detector 3 to the optical circulator port #3. Optical fibers 2, lenses 4, 8, 10 and mirror with hole 9 form optical couplings which couple the laser 1 to port #1 of the optical circulator 12 and on to fiber core 16 via circulator port #2 and which optically couple the fiber inner cladding 15 to another detector 3, which in this example is avalanche photodiode-detector.

In FIG. 4, optical circulator 12 is arranged to direct optical rays transmitted from the light source 1 through port #1 and on towards the fiber core 16 via port #2 and to block any of these transmitted optical rays from reaching detector 3 coupled to port #3. The multi-clad fiber core 16 is arranged to receive the optical rays from the optical circulator port #2 via the optical coupling and route the transmitted optical rays 50 towards optical lens 6. Optical lens 6 is configured both to direct the routed transmitted optical rays on to a target 17 to be sensed and direct reflected optical rays from target 17 towards both the core 16 and the inner cladding 15 of the multi-clad fiber 5. The core 16 and the inner cladding 15 are configured to receive the reflected optical rays 51. Inner cladding 15 is configured to route some of the reflected optical rays for receiving by the detector 3. Optical circulator 12 is arranged to allow any reflected optical rays, received and routed by the core 16 of the optical fiber to port #2 of optical circulator, to reach other detector 3 via circulator port #3. In other embodiments the fiber 7 may be configured to route reflected rays from circulator port #3 to the same detector coupled to the inner cladding. In other embodiments, the optical directing device can be a focusing mirror, for example a parabolic reflector. In yet other examples, any component(s) or mechanism that is capable of focusing the optical rays down into the multi-clad optical fiber can serve as the optical directing device. In other examples, other types of diodes or light to electrical transducers can be used as each detector 3. Also, in other examples, the detectors 3 may be different from one another.

Figure 5:
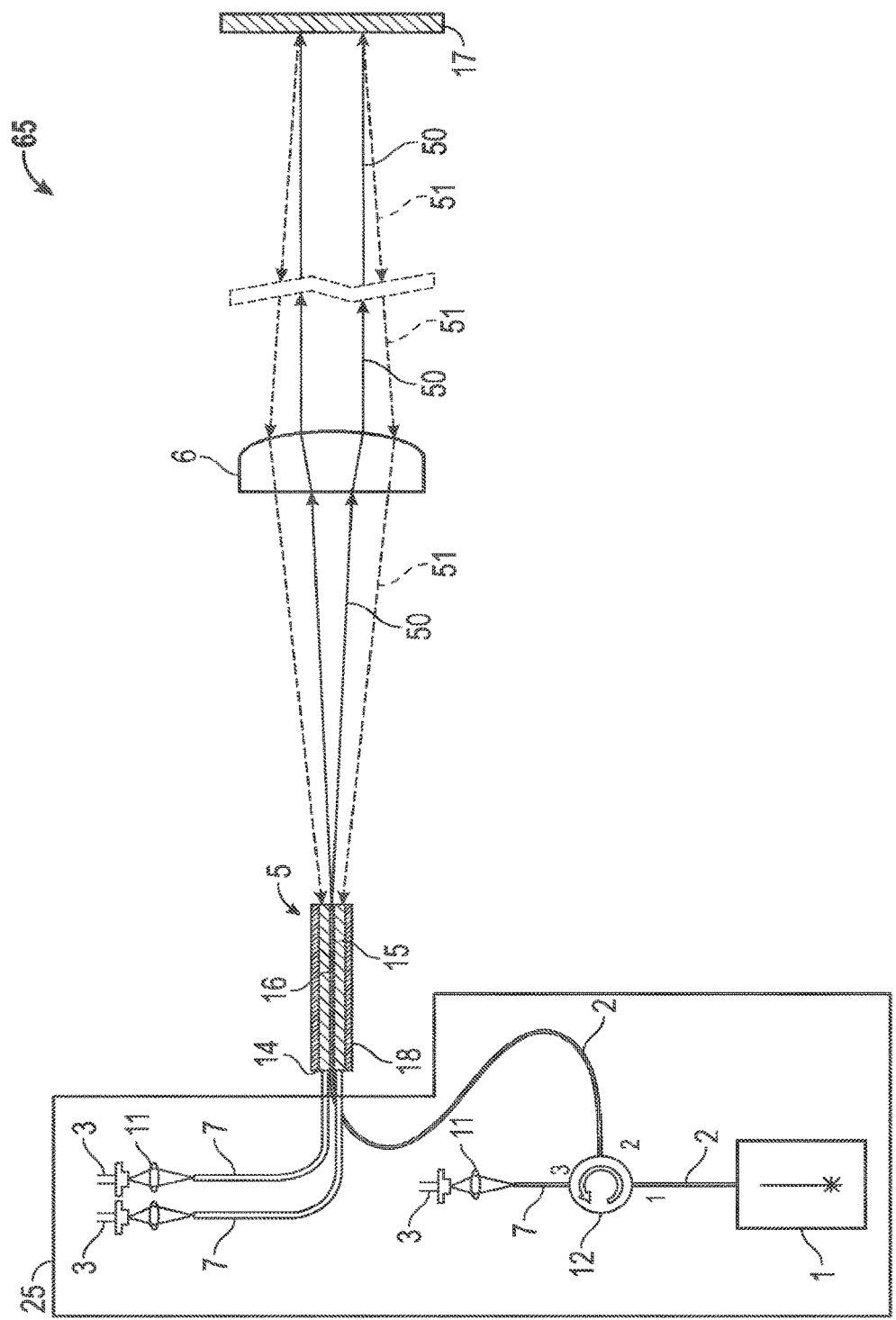
FIG. 5 is a schematic diagram depicting an optical apparatus for a light detecting and ranging (LiDAR) sensing system including an optical circulator according to an embodiment.

Referring to FIG. 5, there is shown a schematic diagram depicting an optical apparatus 65 for light detecting and ranging (LiDAR) sensing including an optical circulator according to another embodiment. The optical apparatus 65 is as shown in FIG. 3 but with an optical sub assembly 25 having an optical circulator 12 integrated therein.

In FIG. 5, optical rays are transmitted from light source 1 through coupling fiber 2 into port #1 of optical circulator 12 and out of optical circulator port #2 to the core of the multi-clad fiber 5 which is arranged to receive and route the transmitted optical rays towards the optical directing device in the form of optical lens 6. Optical circulator 12 blocks the optical rays transmitted from light source 1 from reaching the detector 3 optically coupling circulator port #3. Optical lens 6 is configured both to direct the routed transmitted rays 50 on to a target 17 to be sensed and direct reflected optical rays from a target 17 towards both the core 16 and the inner cladding 15 of the optical fiber. The inner cladding 15 is configured to receive the reflected optical rays 51 and route the reflected optical rays to splicing location 14. At the optical splicing location, the fiber splits the reflected optical rays routed through the inner cladding into a plurality of reflected optical ray beams. A plurality of avalanche photodiode detectors 3, in addition to the detector coupled to port #3, is respectively optically coupled to the multi-clad inner cladding by coupling fibers 7 to respectively detect the reflected plurality of beams. Optical circulator 12 is arranged to allow any reflected optical rays, received and routed by the core of the optical fiber towards the optical circulator, to reach detector 3 coupled to port #3. Optical lenses 11 are configured to couple the optical rays to the detectors 3. In other embodiments, optical lenses 11 may be omitted and fibers 7 may be coupled directly to detectors 3 by proximal location. In other embodiments, the optical directing device 5 can be a focusing mirror, for example a parabolic reflector. In yet other examples, any component(s) or mechanism that is capable of focusing the optical rays down into the multi-clad optical fiber can serve as the optical directing device. In other examples, other types of diodes or light to electrical transducers can be used as each detector 3. Also, in other examples, one or more of the detectors 3 can be a different type of detector. Furthermore, in another example of the apparatus including the optical circulator shown in FIG. 5, optical fibers 7 to the inner cladding can be operably coupled to the same single optical detector 3 thereby routing reflected light to the same detector 3 (see optical apparatus 66 of FIG. 6 that includes an example of an optical sub assembly 26 using multiple optical fibers to operably couple the inner cladding to a single detector).

Figure 7:
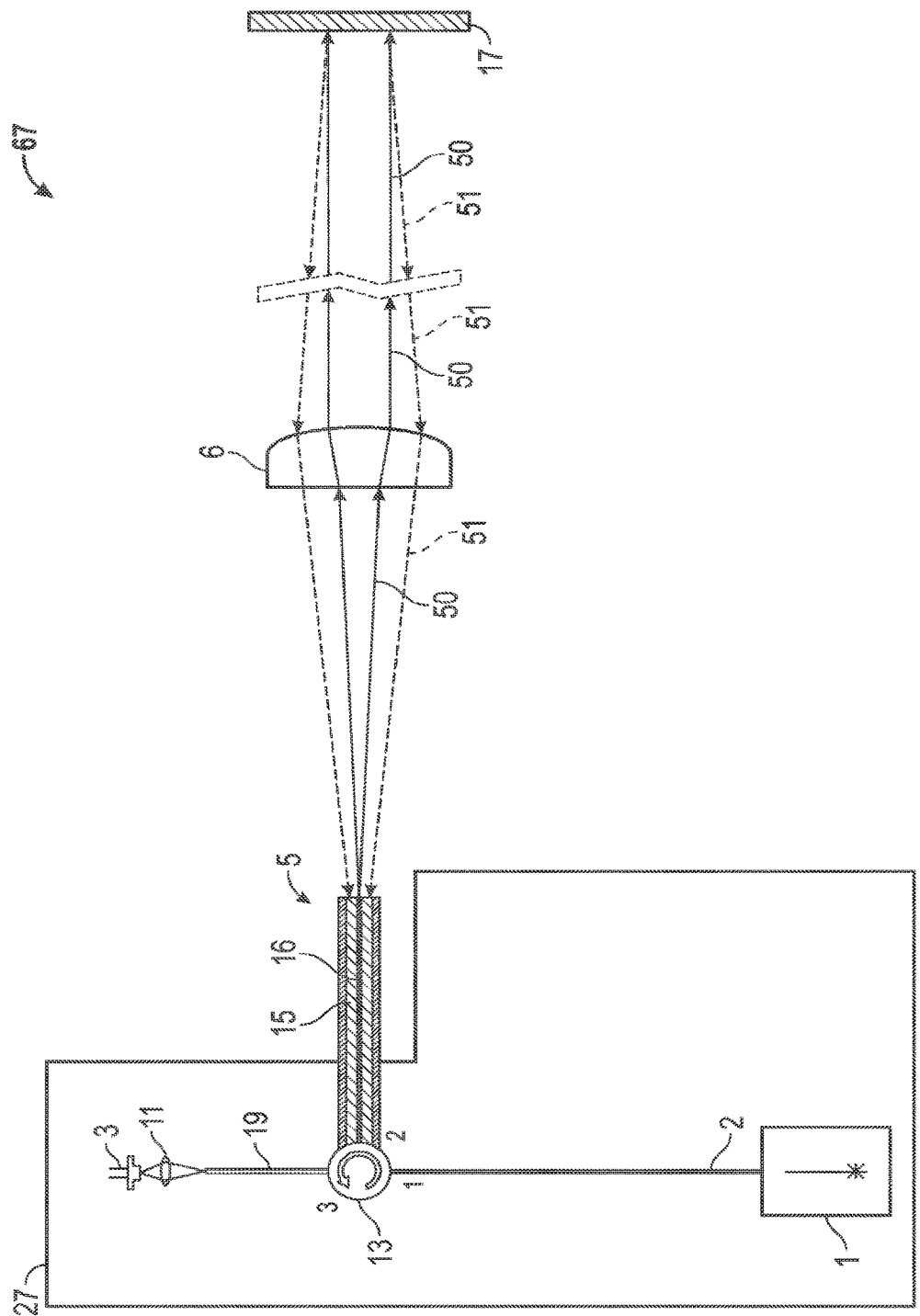
FIG. 7 is a schematic diagram depicting an alternative example of the optical apparatus of FIG. 5 in which a multi-clad fiber is integrated in the optical circulator to route received reflected optical rays to the detector.

FIG. 7 is a schematic of another example of the optical apparatus 67 incorporating an optical circulator according to an embodiment. The optical sub assembly 27 of FIG. 7 comprises an optical circulator 13 that is arranged to optically couple to a single-mode fiber at port #1, a multi-clad fiber at port #2, and a multi-mode fiber at port #3. For example, the means of coupling to a multi-clad fiber at port #2 is identical to coupling a multi-mode fiber whose core diameter is the same as the largest inner cladding diameter of the multi-clad fiber.

Optical rays transmitted from the light source 1 are routed through single-mode fiber 2 into port #1 of the optical circulator 13 which directs those transmitted rays out port #2 into the core of the multi-clad fiber 5 which is arranged to receive and route the transmitted optical rays towards the optical directing device in the form of optical lens 6. Optical circulator 13 blocks the optical rays transmitted from light source 1 from reaching the detector 3 optically coupling circulator port #3. Optical lens 6 is configured both to direct the routed transmitted rays 50 on to a target 17 to be sensed and direct reflected optical rays from a target 17 towards both the core 16 and the inner cladding 15 of the optical fiber. Reflected optical rays received into both the core and the inner cladding of the multi-clad fiber return into port #2 of the circulator and are directed by the circulator out port #3 into multi-mode fiber 19 for detection by detector 3. The multi-mode fiber 19 can be optically coupled to the detector via the coupling lens 11 or coupled directly to the detector without lens 11.

In another aspect of the optical apparatus, a plurality of one or more of the optical assemblies of the embodiments share a common primary lens or other optical directing device for integrating into a multiple laser I multiple detector LiDAR sensor design to allow measurements in multiple directions and at a higher aggregate rate. The benefits of this architecture over known apparatus are the same as for the single laser I detector system.

Figure 8:
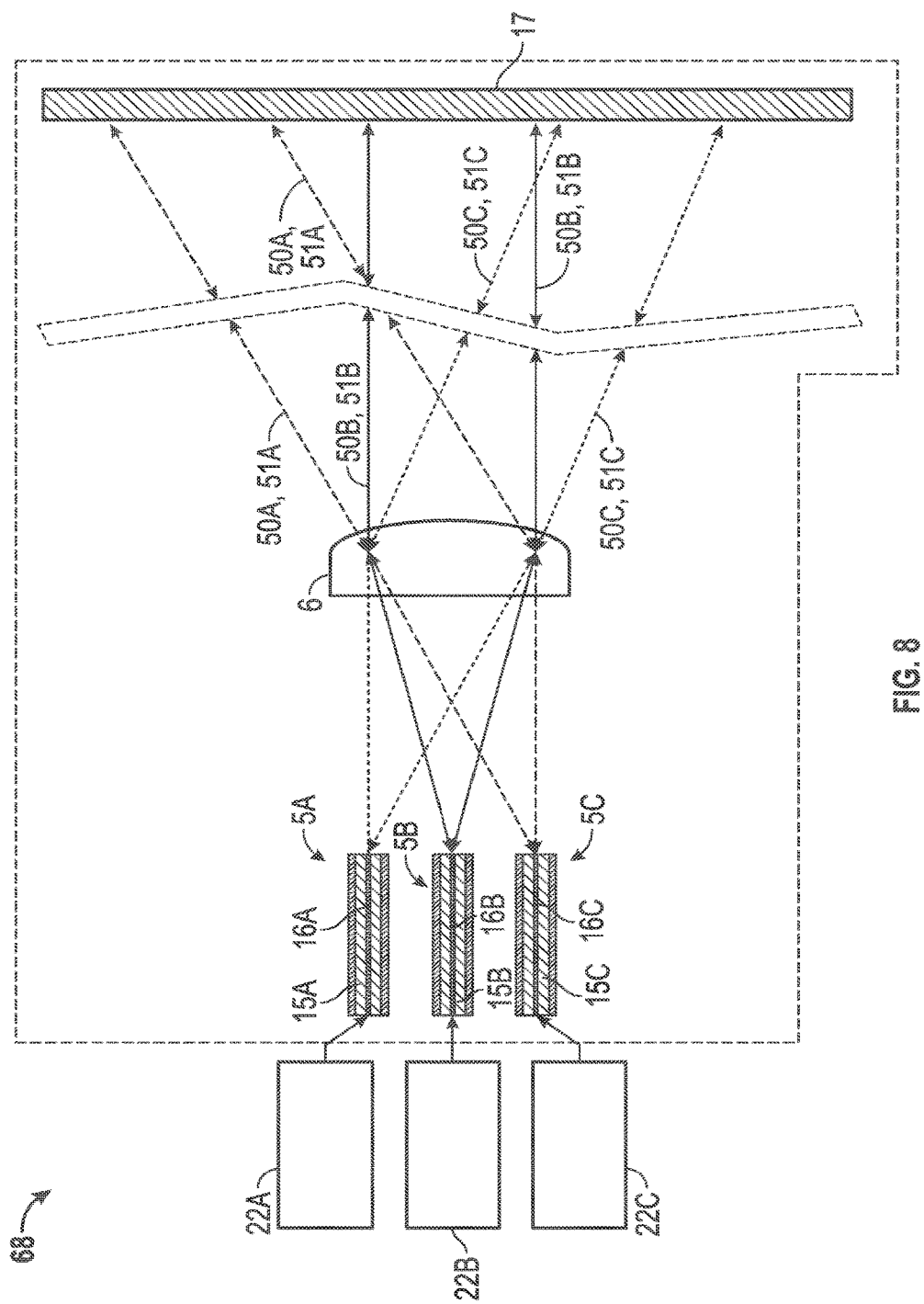
FIG. 8 is a schematic diagram depicting multiple multi-clad fiber based optical apparatus for light detection and ranging sensors according to another embodiment.

By way of example of such an aspect, FIG. 8 is a schematic diagram of a multiple multi-clad fiber based optical apparatus for light detecting and range sensing according to one embodiment. Note that in FIG. 8 (and also FIGS. 9 & 10), the difference in the return rays from the transmitted rays are omitted for clarity to emphasize the angular difference between parallel offset fibers. (Transmitted rays would occupy a smaller area of the lens. Received rays would spread from the target to fill the lens. Received rays would extend beyond the core area of the fibers.)

In FIG. 8, the optical apparatus 68 has a plurality of multi-clad fibers 5A-5C, optical directing device 6 and a plurality of optical sub-assemblies 22A-22C. Each multi-clad fiber 5A-5C has one end optically coupled to a corresponding optical sub assembly 22A-22C to receive optical rays transmitted from a light source 1 of the assembly and the other end oriented to route transmitted optical rays on an optical path leading to the optical directing device. In one embodiment, each sub assembly 22A-22C is the same as sub assembly 22 of FIG. 2.

By way of example in FIG. 8, first multi-clad fiber 5A has one end optically coupled to the first sub assembly 22A to receive in the core 16A of the first fiber 5A first optical rays transmitted from the first light source 1 of the first sub assembly 22A (see FIG. 2 as an example of the sub assembly 22A). The other end of the first fiber core 16A is aligned with the optical directing device 6. The optical directing device 6 is configured both to direct the routed transmitted first rays 50A on an optical path leading to the target 17 to be sensed and direct reflected first optical rays 51A from the target 17 on an optical path leading to the core 16A and the inner cladding 15A at the other end of the first optical fiber 5A.

The second multi-clad fiber 58 has one end optically coupled to a corresponding second sub-assembly 228 to receive in the core 168 of the second fiber second optical rays transmitted from the second light source of the second sub assembly 228 (see FIG. 2 for example of the sub assembly 228). The other end of the second fiber core 168 is aligned with the optical directing device 6. The optical directing device 6 is configured both to direct the routed transmitted second rays 508 on an optical path leading to the target 17 to be sensed and direct reflected second optical rays 51B from the target 17 on an optical path leading to the core 168 and the inner cladding 158 at the other end of the second optical fiber 58.

The third multi-clad fiber 5C has one end optical coupled to a corresponding third sub assembly 22C to receive in the core 16C of the third fiber third optical rays transmitted from the third light source of the third transmitting and receiving sub assembly 22C (see FIG. 2 for example of sub assembly 22C). The other end of the third fiber core 16C is aligned with the optical directing device 6. The optical directing device is configured both to direct the routed transmitted third optical rays 50C on an optical path leading to the target to be sensed and direct reflected third optical rays 51C from the target 17 on an optical path leading to the core 16C and the inner cladding 15C at the other end of the third optical fiber.

The method of operation of the optical apparatus of 68 FIG. 8 is as follows: The first light source of the first sub assembly 22A generates first optical rays which are transmitted through the core 16A of the first fiber 5A onto the optical directing device 6, which in turn, directs the first optical rays 50A onto the target 17 and then directs the reflected rays 51A into the core 16A and the inner cladding 15A. The first fiber 5A receives the reflected first optical first rays and the inner cladding 15A routes the reflected first optical rays for receiving by the detector of the sub assembly 22A. Each of the second and third assemblies 22B-22C in conjunction with their associated second and third fibers 58, 5C and the optical directing device 6, operate in a similar manner.

In other embodiments, one or more of the plurality of sub-assemblies of FIG. 8 can be a sub assembly of an alternative embodiment. For example, each sub assembly 22-A-22C can be the same as sub assembly 23 of FIG. 3, sub assembly 24 of FIG. 4, sub assembly 25 of FIG. 5, sub assembly 26 of FIG. 6, sub assembly 27 of FIG. 7, or sub assembly 28 of FIG. 8.

In other embodiments, one or more of the plurality of sub-assemblies 22A-22C can be different from one or more of the other sub-assemblies of the plurality. The plurality of sub-assemblies can be any combination of the sub-assemblies 21-27 of FIGS. 2 to 7 or variants thereof described herein. Each sub assembly operates in conjunction with the associated multi-clad fiber and the same output directing device as described herein before. In yet other embodiments, the same light source and/or detector can be shared by some or all of the sub-assemblies.

Figure 9:
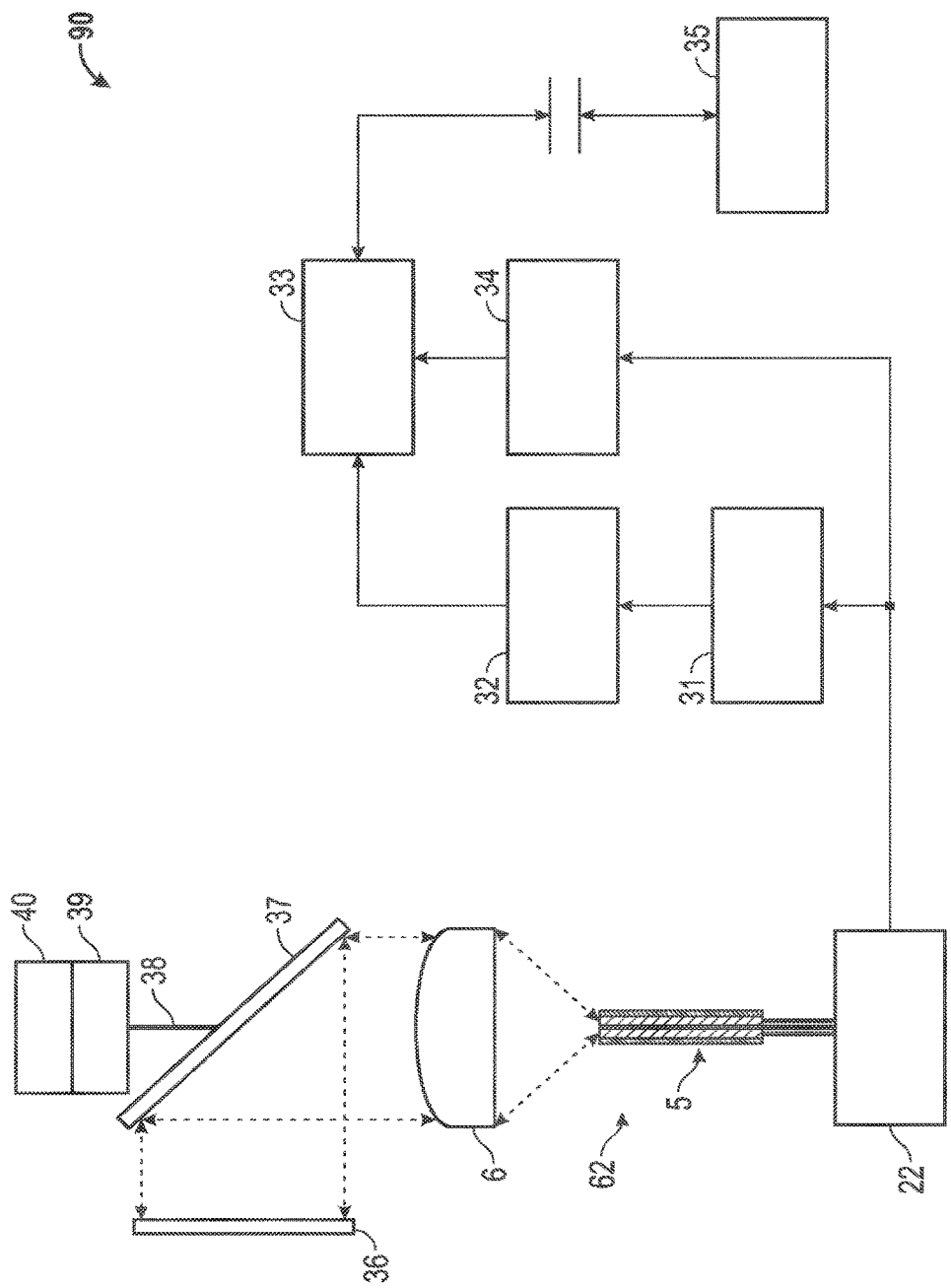
FIG. 9 is a schematic diagram depicting an exemplary LiDAR sensor incorporating the single multi-clad fiber based optical apparatus of FIG. 2 according to one embodiment.

In yet another aspect, a LiDAR sensor incorporates an optical apparatus of any one of the aforementioned embodiments. By way of example, FIG. 9 illustrates a schematic diagram of a LiDAR sensor 90 according one embodiment. LiDAR sensor 90 incorporates optical apparatus 62 of FIG. 2, that is, optical sub-assembly 22, multi-clad fiber 5 and optical directing device 6. Sensor 90 further includes peak detection circuitry 31, time measurement circuitry 32, peak intensity measurement circuitry 34, and general computing device 33 for triggering the laser of the optical sub assembly and processing signals from detectors of the optical sub assembly 22. A user computer 35 can be connected to computer device 33 for manipulating the LiDAR sensor and recording and/or viewing outputs thereof. LiDAR sensor 90 further includes a spinning mirror mechanism comprising spinable mirror 37, motor shaft 38, mirror motor 39 and angle sensor 40. The optical directing device 6 is configured to direct transmitted light from the multi-clad fiber onto the spinable mirror and to direct reflected light received from the spinable mirror into the multi-clad fiber 5. Exterior lens 36 is configured to direct transmitted light from spinable mirror 37 to the exterior of the LIDAR sensor and direct reflected light from the exterior to spinable mirror 37. Spinable mirror is orientated to direct reflected light received from the exterior lens to the optical directing device 6 and to direct transmitted light received from the optical directing device 6 to the exterior lens. The functionality of the LiDAR sensor components for the purpose of triggering the laser of the optical sub assembly 22, processing signals from the detector of the optical sub assembly and operating the spinning mirror are known in the art and will not be described in detail here. In alternative examples, the optical apparatus incorporated into the LiDAR sensor can be any one of the optical apparatus 61, 63-67 of the embodiments or variants thereof described herein instead of optical apparatus 62.

In yet another aspect of the optical apparatus, the optical apparatus of one or more embodiments is integrated into a multiple laser I multiple detector LiDAR sensor design for three-dimensional scanning. Normally, a multiple channel LiDAR sensor requires each laser emitter and detector pair to be precisely aligned. Additionally, if the sensor design transmits through one lens and received through a second lens, parallax errors will be present. Integrating embodiments into a multiple channel LiDAR sensor enables multiple laser emitter and detector pairs to be intrinsically self-aligned and eliminates the need to align separate physical elements and prevents parallax errors. With traditional two-dimensional scanning, the LiDAR sensor detects returns up to 360 degrees about one axis but only in one fixed angle relative to the perpendicular direction. For example, a LiDAR sensor might provide 360-degree along the horizontal field of view but only in one fixed angle along the vertical field of view. A three-dimensional LiDAR sensor also can detect up to 360 degrees about one axis, but it can also detect on multiple angles in the second axis. For example, a three-dimension LiDAR sensor might provide 360-degree along the horizontal field of view and 30 degrees along the vertical field of view. Three-dimension LiDAR sensors are used in perception systems for autonomous vehicles and security systems. The larger vertical field of view increase the area the LiDAR sensor can monitor in real-time and subsequently provide the necessary data to enable advanced object detection and recognition algorithms. Those algorithms are critical to the perception systems and security systems.

By way of example, FIG. 10 illustrates a schematic diagram of a LiDAR sensor according another embodiment. LiDAR sensor 100 is similar to LiDAR sensor 90 but incorporates the multiple multi-clad fiber based optical apparatus 68 of FIG. 8, that is, a plurality of optical sub-assemblies 22A-22C, multi-clad fibers 5A-5C and the one optical directing device 6. The optical directing device 6 is configured to direct respective light rays transmitted from corresponding multi-clad fibers 5A-5C onto the spinable mirror 37 and to direct respective reflected light rays received from the spinable mirror into corresponding multi-clad fibers 5A-5C. Exterior lens 36 is configured to direct transmitted light from spinable mirror 30 to the exterior of the LIDAR sensor and direct reflected light from the exterior to spinable mirror 37. Spinable mirror is orientated to direct reflected light received from the exterior lens to the optical directing device and to direct transmitted light received from the optical directing device 6 to the exterior lens. The functionality of the LiDAR sensor components for the purpose of triggering the laser of the optical sub-assemblies 22, processing signals from the detector of the optical sub-assembly and operating the spinning mirror are known in the art and will not be described in detail here. In alternative examples, the optical sub-assemblies 22 incorporated into the LiDAR sensor can be any one of the optical sub-assemblies 21-27 of the embodiments described herein instead of optical sub-assemblies 22. In yet further embodiments, the plurality of optical sub-assemblies can be made up of any combination of optical sub-assemblies 21-27.

In yet another approach, a translation mechanism is integrated into the optical apparatus of any one embodiment to move the multi-clad fiber end for one or two-dimensional scanning. The translation mechanism is configured to move the multi-clad fiber end from which optical rays are directed to the optical directing device and to which reflected optical rays are received from the optical directing device. The translation mechanism is configured to move in one or more transverse directions while substantially keeping the end of the multi-clad fiber at the same focal relationship to the optical directing device. The direction of the transmitted optical rays and received reflected rays will be altered in direct relationship to the translation of the end of the multi-clad fiber relative to the optical directing device. In another example, equivalently the optical directing device itself is translated relative to the end of the multi-clad fiber. Furthermore, in one example, a small angular tilt of the multi-clad fiber accommodates the translation of either the end of the multi-clad fiber or the optical directing device to keep the optical rays transmitted from the multi-clad fiber near the center of the optical directing device, optimizing performance.

Figure 11:
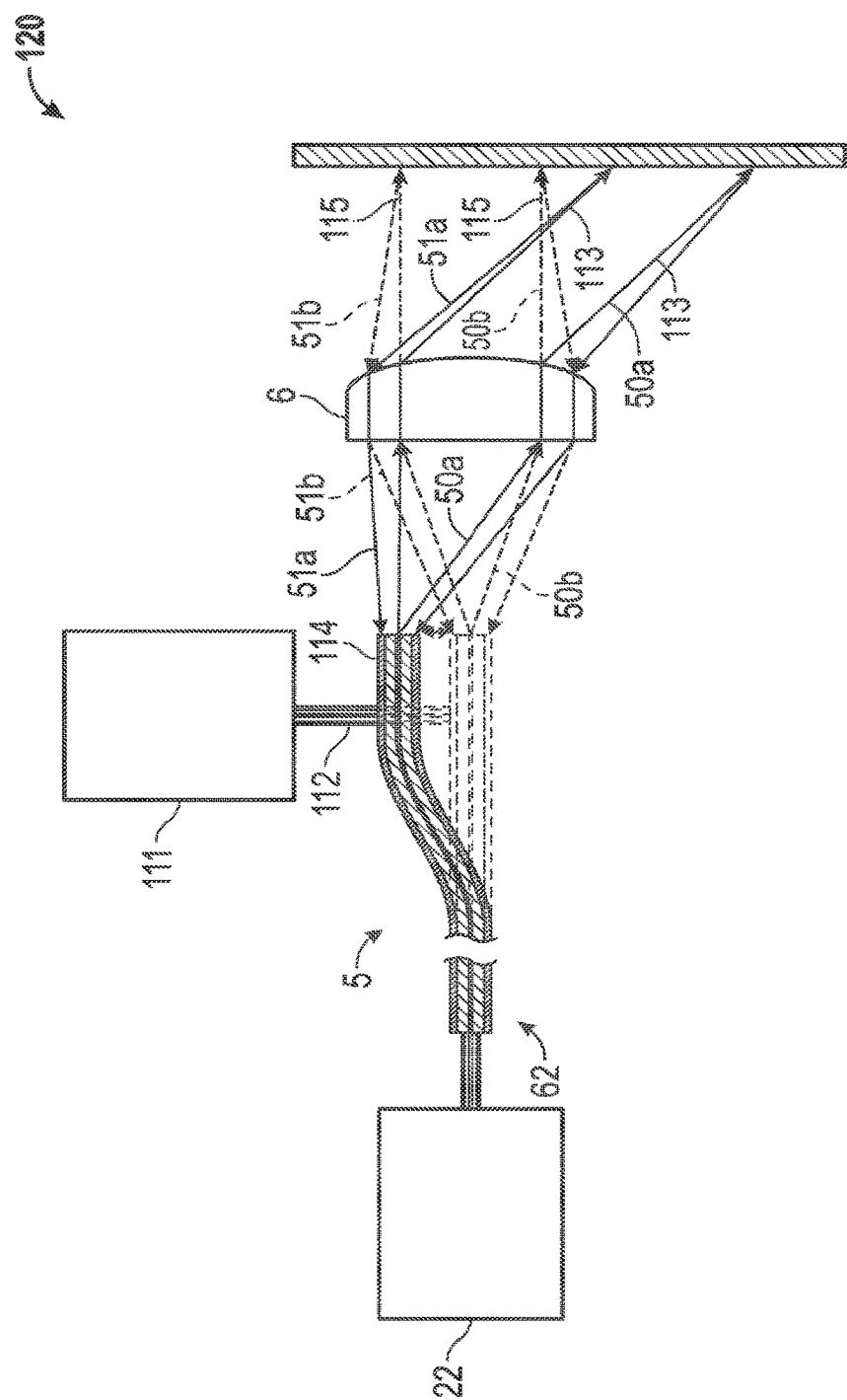
FIG. 11 is a schematic diagram depicting a multi-clad fiber based optical apparatus including a fiber movement mechanism for altering the direction of the optical rays transmitted from the multi-clad fiber according to one embodiment.

One example of the translation mechanism 111 utilized in conjunction with optical apparatus 62 of FIG. 2 is shown in the schematic diagram of FIG. 11. The translation motor 111 is operably coupled to translation shaft 112 for reciprocating the shaft, and in turn the multi-clad fiber end in an axis transverse to the longitudinal axis of the multi-clad fiber end 114. By way of example in FIG. 11, the transverse motor is operable to transversely move the multi-clad fiber end 114 from a first position as indicated by solid line of the multi-clad fiber to a second position as indicated by dotted line of the multi-clad fiber. As indicated in FIG. 11, by transversely moving the fiber end 114 from the first position to the second position, the direction of the light rays (shown in solid line 113) transmitted from the fiber end are altered resulting in the transmitted light rays (see dotted line 115) being directed by the optical directing device 6 to an altered position at the target. A corresponding adjustment in the direction of the rays reflected from the target also results (see dotted line 115) such that the reflected rays are directed by the optical directing device to the multi-clad fiber in the second position.

In other examples, the fiber translation mechanism can be utilized in conjunction with other optical apparatus 61-68 of the embodiments. In examples in which the optical apparatus includes a plurality of multi-clad fibers such as optical apparatus 68, the transverse shaft of the translation mechanism is operably connected to the fibers to move the fiber ends in parallel directions.

While preferred embodiments of the present invention have been described and illustrated in detail, it is to be understood that many modifications can be made to the embodiments, and features can be interchanged between embodiments, without departing from the spirit of the invention.

What is claimed is:

1. A light detection and ranging (LiDAR) sensor comprising:
   a laser outputting laser light;
   a single-mode fiber positioned to receive the laser light from the laser;
   an optical circulator comprising a first port, a second port, and a third port, the optical circulator configured to direct the laser light from the first port to the second port and from the second port to the third port, the optical circulator receiving the laser light from the single-mode fiber at the first port;
   a multi-clad fiber comprising a core, an inner cladding, and an outer cladding, the core receiving the laser light from the second port of the optical circulator and directing the laser light from the second port to a target, the inner cladding and the core receiving reflected light from the target;
   a first optical detector positioned to receive the reflected light from the inner cladding of the multi-clad fiber and not the core of the multi-clad fiber; and
   a second optical detector positioned to receive the reflected light from the core of the multi-clad fiber and not the inner cladding of the multi-clad fiber.

2. The LiDAR sensor of claim 1, wherein the core of the multi-clad fiber transmits the reflected light to the second port of the optical circulator.

3. The LiDAR sensor of claim 2, further comprising:
   a multi-mode fiber coupled to the third port of the optical circulator and receiving the reflected light from the second port of the optical circulator, the multi-mode fiber transmitting the reflected light to the second optical detector.

4. The LiDAR sensor of claim 1, further comprising:
   an optical directing device focusing the laser light from the core of the multi-clad fiber toward the target, and focusing the reflected light from the target to the inner cladding and the core of the multi-clad fiber.

5. The LiDAR sensor of claim 4, wherein the optical directing device comprises a lens.

6. The LiDAR sensor of claim 4, wherein the optical directing device comprises a mirror.

7. The LiDAR sensor of claim 4, wherein the optical directing device comprises at least one lens, and wherein the laser light to the target and the reflected light from the target are both directed by the at least one lens.

8. The LiDAR sensor of claim 4, wherein the optical directing device comprises at least one mirror, and wherein the laser light to the target and the reflected light from the target are both directed by the at least one mirror.

9. The LiDAR sensor of claim 4, further comprising:
   a transverse motion device configured to dynamically change a position of the multi-clad fiber relative to the optical directing device.

10. The LiDAR sensor of claim 9, wherein the optical directing device focuses the laser light from the multi-clad fiber to the target and focuses the reflected light from the target to the multi-clad fiber, and wherein the dynamically changing position of the multi-clad fiber substantially maintains a focal relationship with the optical directing device.

11. The LiDAR sensor of claim 9, wherein the transverse motion device oscillates the multi-clad fiber at a frequency between 5 Hz and 5000 Hz.

12. The LiDAR sensor of claim 1, wherein the first and the second optical detectors comprise avalanche photodiodes.

13. A compound light detection and ranging (LiDAR) sensor comprising a plurality of LiDAR sensors, each of the plurality LiDAR sensors comprising:
   a laser outputting laser light;
   a single-mode fiber positioned to receive the laser light from the laser;
   an optical circulator comprising a first port, a second port, and a third port, the optical circulator configured to direct the laser light from the first port to the second port and from the second port to the third port, the optical circulator receiving the laser light from the single-mode fiber at the first port;
   a multi-clad fiber comprising a core, an inner cladding, and an outer cladding, the core receiving the laser light from the second port of the optical circulator and directing the laser light from the second port to a target, the inner cladding and the core receiving reflected light from the target;
   a first optical detector positioned to receive the reflected light from the inner cladding of the multi-clad fiber and not the core of the multi-clad fiber; and
   a second optical detector positioned to receive the reflected light from the core and not the inner cladding of the multi-clad fiber.

14. The compound LiDAR sensor of claim 13, wherein the core of the multi-clad fiber transmits the reflected light to the second port of the optical circulator.

15. The compound LiDAR sensor of claim 14, each of the plurality LiDAR sensors further comprising:
   a multi-mode fiber coupled to the third port of the optical circulator and receiving the reflected light from the second port of the optical circulator, the multi-mode fiber transmitting the reflected light to the second optical detector.

16. The compound LiDAR sensor of claim 13, each of the plurality LiDAR sensors further comprising:

an optical directing device focusing the laser light from the core of the multi-clad fiber toward the target, and focusing the reflected light from the target to the inner cladding and the core of the multi-clad fiber.

17. The compound LiDAR sensor of claim 16, wherein the optical directing device comprises a lens.

18. The compound LiDAR sensor of claim 16, wherein the optical directing device comprises a mirror.

19. The compound LiDAR sensor of claim 16, wherein the optical directing device comprises at least one lens, and wherein the laser light to the target and the reflected light from the target are both directed by the at least one lens.

20. An optical apparatus comprising:
a light source outputting light;
a single-mode fiber positioned to receive the outputted light from the light source;
an optical circulator comprising a first port, a second port, and a third port, the optical circulator configured to direct the outputted light from the first port to the second port and from the second port to the third port, the optical circulator receiving the outputted light from the single-mode fiber at the first port;
a multi-clad fiber comprising a core, an inner cladding, and an outer cladding, the core receiving the outputted light from the second port of the optical circulator and directing the outputted light from the second port to a target, the inner cladding and the core receiving reflected light from the target;
a first optical detector positioned to receive the reflected light from the inner cladding of the multi-clad fiber and not the core of the multi-clad fiber; and
a second optical detector positioned to receive the reflected light from the core of the multi-clad fiber and not the inner cladding of the multi-clad fiber.

* * * * *